United States Patent
Yoakim et al.

(10) Patent No.: US 7,993,691 B2
(45) Date of Patent: Aug. 9, 2011

(54) CAPSULE WITH SEALING MEANS AND ITS USE IN PRODUCING A BEVERAGE

(75) Inventors: Alfred Yoakim, St-Legier-La Chiesaz (CH); Gilles Gavillet, Ursy (CH); Jean-Paul Denisart, La Conversion (CH)

(73) Assignee: Nestec S.A., Vevey (CH)

( * ) Notice: Subject to any disclaimer, the term of this patent is extended or adjusted under 35 U.S.C. 154(b) by 1197 days.

(21) Appl. No.: 11/258,433

(22) Filed: Oct. 25, 2005

(65) Prior Publication Data

US 2006/0110507 A1    May 25, 2006

(30) Foreign Application Priority Data

Oct. 25, 2004  (EP) ..................................... 04025320

(51) Int. Cl.
*A23F 5/00*  (2006.01)
(52) U.S. Cl. ............. 426/77; 426/112; 426/433; 99/295
(58) Field of Classification Search .................. 426/112, 426/77, 433; 99/295; 715/733, 738, 751, 715/753, 760, 764, 765, 964, 205; 707/1, 707/9, 10, 104.1; 709/200, 201, 203, 205, 709/217, 219
See application file for complete search history.

(56) References Cited

U.S. PATENT DOCUMENTS

| | | | |
|---|---|---|---|
| 3,445,237 A | | 5/1969 | Gidge |
| 4,136,202 A | | 1/1979 | Favre ............................. 426/77 |
| 4,254,694 A | * | 3/1981 | Illy ................................. 99/295 |
| 4,429,623 A | * | 2/1984 | Illy ................................. 99/295 |
| 4,471,689 A | | 9/1984 | Piana ............................. 99/295 |
| 5,008,013 A | | 4/1991 | Favre et al. .................... 210/482 |
| 5,072,661 A | | 12/1991 | Kondo ........................... 99/296 |
| 5,108,768 A | | 4/1992 | So ................................. 426/77 |
| 5,197,374 A | | 3/1993 | Fond ............................. 99/295 |
| 5,242,702 A | * | 9/1993 | Fond ............................. 426/433 |
| 5,327,815 A | * | 7/1994 | Fond et al. .................... 99/295 |
| 5,398,595 A | * | 3/1995 | Fond et al. .................... 99/295 |
| 5,402,707 A | | 4/1995 | Fond et al. |
| 5,472,719 A | * | 12/1995 | Favre ............................. 426/77 |
| 5,649,472 A | | 7/1997 | Fond et al. .................... 99/295 |
| 5,656,316 A | * | 8/1997 | Fond et al. .................... 426/433 |

(Continued)

FOREIGN PATENT DOCUMENTS

AU         51 220/73         7/1974

(Continued)

OTHER PUBLICATIONS

Non-Final Office Action dated Sep. 1, 2009 for U.S. Appl. No. 11/737,560.

(Continued)

*Primary Examiner* — Anthony Weier
(74) *Attorney, Agent, or Firm* — Winston & Strawn LLP

(57) ABSTRACT

A capsule contains beverage ingredients such as ground coffee, tea or other ingredients and is configured for insertion in a beverage production device in order to have a liquid under pressure have enter the capsule and to interact with the ingredients in the capsule. The capsule has a base body and a foil member closing the base body by being attached to a flange-like rim extending from the side wall of the base body of the capsule. The base body of the capsule has a resilient sealing member, the sealing member being designed to be in sealing engagement with a bell member of the beverage production device.

28 Claims, 14 Drawing Sheets

U.S. PATENT DOCUMENTS

| | | | |
|---|---|---|---|
| 5,897,899 A | 4/1999 | Fond | |
| 6,026,732 A * | 2/2000 | Kollep et al. | 99/295 |
| 6,832,542 B2 | 12/2004 | Hu et al. | 99/302 R |
| 6,955,116 B2 | 10/2005 | Hale | 99/295 |
| 7,640,842 B2 | 1/2010 | Bardazzi | 99/295 |
| 2001/0052294 A1 | 12/2001 | Schmed | 99/295 |
| 2002/0121198 A1 | 9/2002 | Kollep et al. | 99/279 |
| 2003/0089245 A1 | 5/2003 | Kollep et al. | 99/495 |
| 2003/0217643 A1 | 11/2003 | Masek et al. | 99/279 |
| 2004/0191371 A1 | 9/2004 | Halliday et al. | |
| 2004/0206245 A1 | 10/2004 | Halliday et al. | |
| 2004/0228955 A1 | 11/2004 | Denisart | 426/590 |
| 2004/0231521 A1 | 11/2004 | Yoakim | 99/275 |
| 2007/0104837 A1 | 5/2007 | Yoakim | 426/77 |
| 2007/0202237 A1 | 8/2007 | Yoakim et al. | 426/590 |
| 2007/0224319 A1 | 9/2007 | Yoakim et al. | 426/433 |
| 2009/0280219 A1 | 11/2009 | Yoakim et al. | 426/77 |

FOREIGN PATENT DOCUMENTS

| | | |
|---|---|---|
| CH | 503 630 A | 4/1971 |
| DE | 938 984 | 1/1956 |
| DE | 14 29 932 A1 | 3/1969 |
| DE | 35 04 441 A1 | 8/1986 |
| EP | 0 361 634 A1 | 4/1990 |
| EP | 0361569 | 4/1990 |
| EP | 0 468 080 | 1/1992 |
| EP | 0468079 | 1/1992 |
| EP | 0 512 468 | 11/1992 |
| EP | 0512470 | 11/1992 |
| EP | 0 604 615 | 7/1994 |
| EP | 0 710 462 A1 | 5/1996 |
| EP | 01710462 | 5/1996 |
| EP | 1 090 574 B1 | 4/2001 |
| EP | 1 101 430 | 5/2001 |
| EP | 1 203 544 A1 | 5/2002 |
| EP | 1 327 407 A2 | 7/2003 |
| EP | 1 344 724 | 5/2006 |
| EP | 1 654 966 A1 | 5/2006 |
| FR | 2041380 | 1/1971 |
| FR | 2093111 | 1/1972 |
| FR | 2 160 634 A1 | 6/1973 |
| FR | 2160634 | 6/1973 |
| FR | 2213757 | 8/1974 |
| FR | 2617389 | 1/1989 |
| GB | 899055 A | 6/1962 |
| RU | 2311109 | 11/2007 |
| WO | WO 93/17932 A1 | 9/1993 |
| WO | WO 94/02059 A1 | 2/1994 |
| WO | WO 95/10724 | 4/1995 |
| WO | WO 02/43541 | 6/2002 |
| WO | WO 03/059778 | 7/2003 |
| WO | WO 2004/071259 | 8/2004 |
| WO | WO 2005/004683 | 1/2005 |

OTHER PUBLICATIONS

Final Office Action dated Apr. 2, 2010 for U.S. Appl. No. 11/737,560.
Advisory Action dated Jun. 15, 2010 for U.S. Appl. No. 11/737,560.
Non-Final Office Action dated Jul. 22, 2010 for U.S. Appl. No. 11/737,560.
Restriction Requirement dated Feb. 3, 2010 for U.S. Appl. No. 11/737,334.
Non-Final Office Action dated Apr. 9, 2010 for U.S. Appl. No. 11/737,334.
Final Office Action dated Aug. 18, 2010 for U.S. Appl. No. 11/737,334.
Notice of Opposition to European patent No. 1 700 548 dated May 8, 2008.
Notice of Opposition to European patent No. 1 816 935 dated Oct. 7, 2009.
Copending U.S. Appl. No. 11/737,560, filed Apr. 19, 2007 and office Actions therein.
International Search Report and Written Opinion mailed Dec. 23, 2005, Application No. PCT/EP2005/011306 filed Oct. 20, 2005.
Final Office Action mailed Feb. 3, 2011 for U.S. Appl. No. 11/737,560 filed Apr. 19, 2007.

* cited by examiner

CAPSULE WITH SEALING MEANS AND ITS USE IN PRODUCING A BEVERAGE

BACKGROUND

The present invention generally relates to capsules for containing beverage ingredients, to a beverage producing system for use in connection with such capsules as well as to methods for producing beverages on the basis of ingredients contained in such capsules.

The background of the present invention is the field of capsules which contain beverage or other comestible (e.g. soup) ingredients. By means of an interaction of these ingredients with a liquid, a beverage or other comestibles, such as for example soups, can be produced. The interaction can be for example an extraction, brewing, dissolution, etc. process. Such a capsule is particularly adapted to contain ground coffee in order to produce a coffee beverage by having hot water under pressure enter the capsule and draining a coffee beverage from the capsule.

A capsule as shown in FR 2160634 relates to an apparatus for making coffee beverage from a cartridge in which a water injection device is placed hermetically against the upper side of the cartridge. The water injection device includes a seal which is applied on the upper rim of the capsule. However, the seal is part of the apparatus.

EP 0361569 A1 does not show a sealed capsule, but a coffee filter unit which is not sealed when placed into the coffee machine but simply press fitted in a cartridge casing, such that water can be poured on a filter paper provided at the open upper side of the coffee filter unit. To avoid spilling of water outside the filter unit's upper rim, the peripheral portion of a filter paper is clamped between the outer rim of the coffee filter unit wall and the surrounding wall of the machine. Such a design is a device which filters a beverage at atmospheric pressure and which is so not adapted to withstand the typical water injection pressure of e.g. more than 3 bars or even much higher pressure which reigns in the capsule when an espresso-style coffee is produced.

FR 2617389 describes a low cost filter cartridge adapted to be brewed at relatively low pressure in a beverage device. The body of the capsule is entirely made from injection-moulded plastic, preferably polypropylene as the main constituent of the capsule. The capsule has a flange like-rim made of the same material as the main constituent of the capsule which is thus crushed during closure of the device about the capsule. The capsule is combined to a brewing device which is a bayonet-like closure system which applies closure forces on the capsule's rim which depends on the tightening torque applied by the user. Therefore, the capsule's rim is crushed up to a point at which a certain seal effect can be obtained. One problem is that it is not possible with a simple flange-like rim, even with an increase of thickness, made of the same plastic material as the body of the capsule that normally requires a sufficient rigidity, to provide a seal effect which is sufficient to stop water or maintain a controlled internal pressure level, at the elevated relative pressure of extraction; i.e., within a pressure range sufficient to deliver an espresso-like coffee with crema. Furthermore, most modern beverage machines have closure devices that close at a predefined closure force and do not depend on the user's force therefore requiring an adaptation of the seal to the machine and not the opposite.

Systems and methods for obtaining fluid comestibles from substances containing capsules are for example known from EP-A-512470 (counterpart of U.S. Pat. No. 5,402,707).

SUMMARY

According to another aspect of the present invention a capsule is proposed having a base body and/or foil member made of plastics material, wherein at least a portion of the base body is designed to be perforated when properly placed in the beverage production device.

According to another aspect a beverage producing system is proposed comprising such capsule and a beverage production device.

According to a further aspect of the present invention the method for producing a beverage is proposed in which a pressure-tight sealing engagement of an element of the beverage production device and a sealing member of the capsule assures that the only liquid medium flow path between the perforated opening in the top wall of the cup-like base and the opening in the foil member traverses the interior of the capsule.

Another aspect of the present invention relates to a beverage producing method according to which both in the base body and the foil member of such capsule, both being made of plastics, perforations are generated.

The term "matching pressing surface" as used herein is typically a portion of the beverage production device. This can be a surface of the enclosing member which is typically one part of the device which covers at least one side of the capsule upon closing of the device to encompass the capsule.

Additional features and advantages are described herein, and will be apparent from, the following Detailed Description and the figures.

DETAILED DESCRIPTION

Figure 1:
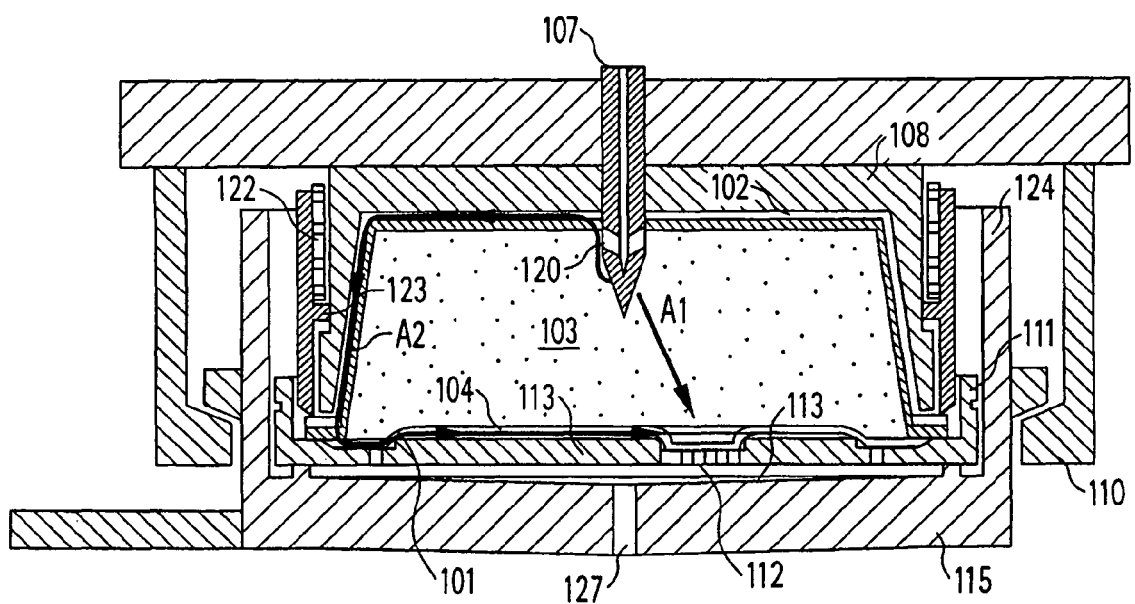
FIG. 1 shows an extraction capsule known from EP-A-512470.

The capsule 101, as shown in FIG. 1 has a frustroconically-shaped cup 102 which may be filled e.g. with roasted and ground coffee 103 and which is closed by a foil-like tear face cover 104 welded and/or crimped to a flange-like rim which extends laterally from the side-wall of cup 102. A capsule holder 111 comprises a flow grill 112 with relief surface element members 113.

The capsule holder 111 is accommodated in its support 115 which has a lateral wall 124 and a bore 127 for the passage of extracted coffee beverage.

As can be seen from FIG. 1 the extraction system further comprises a water injector 107 having a water inlet channel 120 and an annular element 108 with an internal recess of which the shape substantially corresponds to the outer shape of the capsule. On its outer part, the annular member 108 comprises a spring 122 holding a ring 123 for releasing the capsule on completion of extraction.

In operation, a capsule 101 is placed in the capsule holder 111. The water injector 107 perforates the upper face of the cup 102. The lower tear face 104 of the capsule rests on the radially arranged members 113 of the capsule holder 111.

The water is injected through the channel 120 of the water injector 107 and impinges on the bed 103 of coffee. The pressure in the capsule 101 increases and the tear face 104 increasingly follows the shape of the radial opening relief members 113. Such radial opening relief members could be replaced by pyramid-shaped reliefs or other shapes of relief. When the constituent material of the tear face reaches its breaking stress, the tear face tears along the relief members. The extracted coffee flows through the orifices of the flow grill 112 and is recovered in a container (not shown) beneath the bore 127.

The principles of this extraction process as far as it can be maintained in connection with the present invention can be summarized as follows:

An initially sealed capsule is inserted in capsule holder means;

The capsule holder means is then introduced associated to the water injection means of the machine such that an annular element (108 in FIG. 4) surrounds the sealed capsule.

In a first wall of the capsule at least one opening is generated.

Water entering the capsule through the opening in the first wall is interacting with the ingredients contained in the capsule while traversing the interior of the capsule and is then made to leave the capsule through at least one opening/perforation created in the second wall.

The ingredients in the capsule constitute the "bottleneck" of the flow path of the water and will therefore cause a pressure drop between the upstream and the downstream side of the liquid flow through the capsule, which pressure drop will even increase during the interaction between the liquid and the ingredients for example due to a swelling of the ingredients. Correspondingly it has to be assured that the only water flow is actually taking place through the interior of the capsule (arrow A1) and that no water can flow from the water injector into the interstice between the annular enclosing member 108 and the exterior of the capsule 101 and then to the draining bore 127 of the device. The arrow A2 illustrates this undesired water flow path. With other words, any water flow exterior to the capsule 101 has to be stopped by a sealing engagement being positioned in the interstice between the annular member 108 and the capsule 101 and in the flow path between the water injector and the beverage-draining bore. In the embodiment as shown in FIG. 1 such sealing engagement can be achieved at least to a certain degree by the pinching engagement between the annular member 108, the flange-like rim of the side wall of the capsule 101 and the capsule holder.

In case the sealing engagement is not working properly and water is flowing outside the capsule, no pressure sufficient to cause the tearing of the tear face will be built up inside the capsule or, alternatively, the pressure will be causing no complete tearing of the tear face and therefore a poor extraction of the substance. In such a scenario water will be drained from the beverage production device without having interacted or fully interacted under sufficient pressure conditions, with the ingredients contained in the capsule.

An improvement could be thought of according to which this sealing engagement is further improved by lining the inner wall of the annular member with a rubber-elastic material. With other words, according to said approach the sealing engagement is assured by structures fixed to or attached with the beverage-producing device. This has disadvantages in that after the use of a substantial number of capsules a wearing off of the fixed sealing means can take place such that the quality of the produced beverage is increasingly deteriorated by water passing the no longer properly efficient sealing.

Any "leak" at the exterior of the capsule reduces the pressure build-up inside the capsule. On the other hand, it is well known that a sufficient extraction pressure is a key factor for the quality of espresso-style coffee.

The present invention correspondingly aims at an improvement of the sealing engagement positioned between the liquid inlet and the beverage draining side of such a beverage production system.

It is thereby the central idea of the present invention to transfer a resilient part of the sealing engagement from the beverage production device to the capsule. The advantage is that any resilient sealing member is only used once (i.e. only with the associated capsule) such that a proper functioning of the sealing can be assured and no hygienic problems can occur at the sealing member.

Note that the present invention thus especially aims at an improvement of the capsules, such that state-of-the-art beverage production devices with built-in sealing means as for example shown in EP-A-512470 can also be used in connection with a capsule according to the present invention.

The object is achieved by means of the features of the independent claims. The depending claims develop further the central idea of the present invention.

According to a first aspect of the present invention a capsule for containing beverage (or other liquid comestibles) ingredients is proposed. The capsule is designed for insertion in a beverage production device in order to have a liquid under pressure have enter the capsule and to interact with the ingredients in the capsule. According to the invention the outer surface of the capsule comprises a resilient sealing member being structurally arranged to be in a sealing engagement with at least a matching pressing surface of the beverage production device.

The resilient sealing member of the capsule is deformed when the capsule is put in sealing engagement with the enclosing member of the beverage production device. The deformation leads to an initial biasing of the sealing member against the enclosing member.

The sealing member can thereby be resilient due to its shape and/or the material used.

The sealing member can be bendable so that it can exert a biasing force against the matching pressing surface of the beverage production device.

The sealing member can also be compressible so that the sealing engagement is obtained by the pressing surface of the beverage production device exerting a positive pressure force on the sealing member, from a first uncompressed thickness of the capsule to a second compressed thickness of the member.

The sealing member can be made integral to the capsule or be associated as a separate piece to the capsule. In the latter case the sealing member can be removable or, alternatively, can be fixedly connected to the capsule.

The sealing member can for example have the shape of an O or L-shaped ring.

The sealing member can be attached to the capsule using an adhesive or by (thermal or ultrasonic) welding. Alternatively the sealing member can be held in position surrounding the capsule due to its inherent material tension or stretching characteristics. In another possible embodiment, the sealing member may be pinched by the capsule material.

The capsule can be made of plastics or a metal such as e.g. aluminum.

Figure 2:
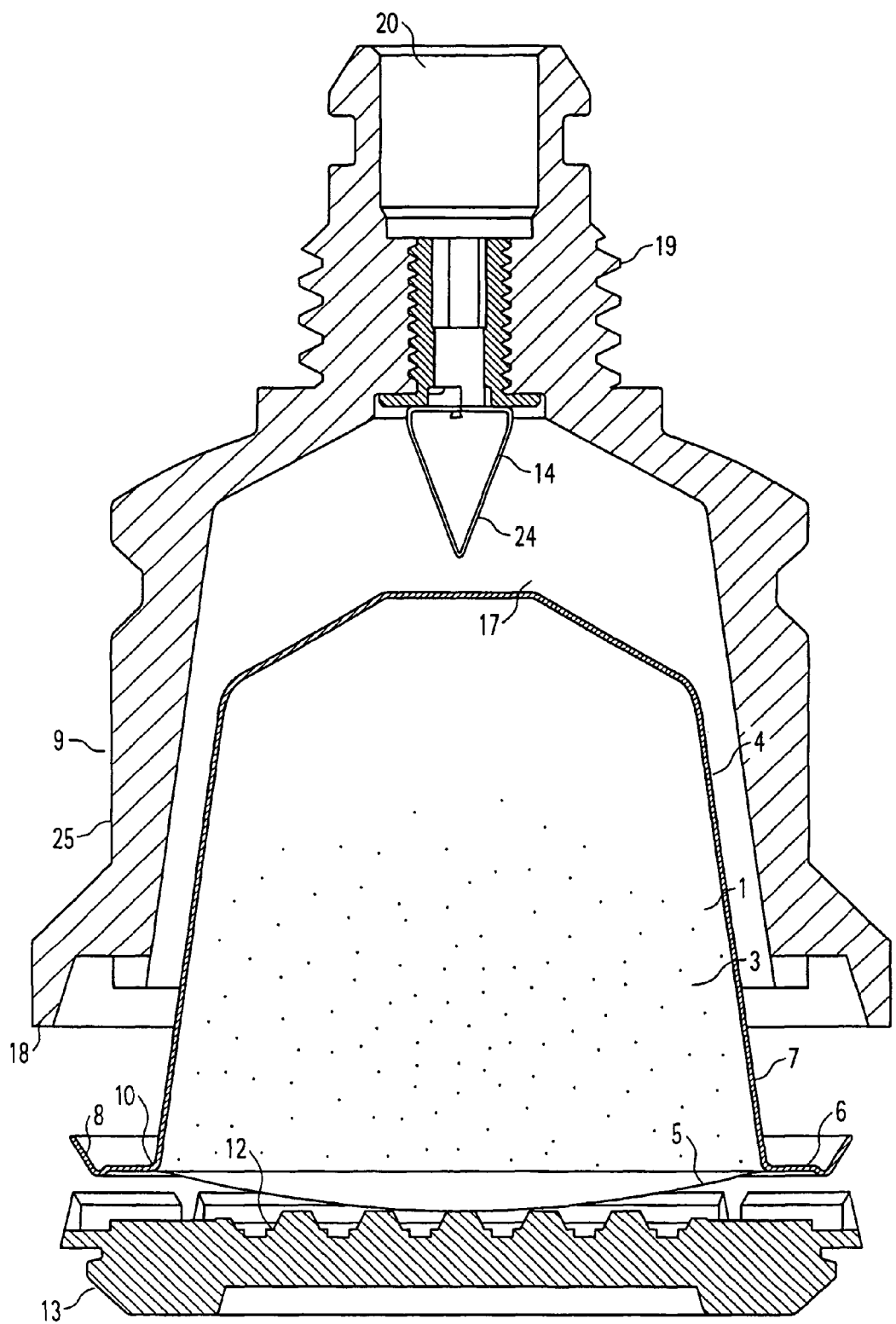
FIG. 2 shows a first embodiment of the present invention in which a capsule is placed on the capsule holder but has not yet reached its closing position in the beverage production device.

With reference to FIG. 2 now a first detailed embodiment will be explained.

Note that in the following the invention will be explained referring to a certain design of a capsule, i.e. a design according to which the capsule comprises a cup-like base body and a closing foil member. However, it is to be understood than other designs of the capsule are viable, such as e.g. capsules having an inverted cone or a lenticular form with two essentially matching and opposing walls (e.g. foils) being sealed at the e.g. ring-shaped edge. Generally a capsule according to the present invention comprises at least two opposing wall members which are connected to each other at the edges to form a sealed flange-like rim area, thus enclosing a sealed interior.

Comparable to the prior art also this embodiment shows a capsule holder 13 having relief elements 12 which are designed to tear and perforate a foil member 5 closing off a cup-like base body 4 of the capsule 1. This tearing of the foil member can e.g. occur as soon as the pressure inside the capsule exceeds a threshold value. The word "tearing" includes actions such as breaking, cutting or puncturing as well as typical tearing by stretching the material beyond its tensile strength. Note that the relief elements can have any protruding shape able to cause a (partial) tearing of the foil member. As an example only pyramids, needles, blades, bumps, cylinders, elongated ribs are cited.

Within the capsule 1 ingredients 3 are contained, wherein the ingredients 3 are selected such that a beverage can be produced when having a liquid entering the capsule in the region of the top wall 17 of the capsule 1 and then interact which such ingredients 3. Preferred ingredients are e.g. ground coffee, tea or any other ingredients from which a beverage or other liquid or viscous comestible (e.g. soup) can be produced.

FIG. 2 shows a state in which such a capsule has been placed on a capsule holder 13, the foil member 5 resting on the relief element 12 side of the capsule holder 13 and the cup-like base body 4 of the capsule 1 being already partly surrounded by the circumferential wall 25 of an enclosing member 9 of the beverage production device. The shown enclosing member has the shape of a bell. Other shapes are viable, wherein the design of the interior contours (recess) of the enclosing member is generally adapted to substantially match the contours of the capsule 1.

Note that the foil member 5 as shown is not exactly flat due to a defined over pressure inside the capsule, which over pressure is generated by introducing e.g. a protective gas when producing the filled capsule.

The capsule can also include one of more inner filters. A bottom filter can be placed in contact with the inner surface of the foil 5 and/or a top filter can be placed at least partially in contact with the inner surface of the body 4.

In another mode, the capsule can also have foil member 5 which is flat or even curved inwardly toward the interior of the chamber and that deforms at a certain amplitude as a response to the pressure exerted inside the chamber during the extraction process.

The enclosing (bell) member 9 furthermore comprises an annular support skirt 18, the function of which will be explained later, an external thread 19 for mounting the bell member in a beverage production device and a water inlet opening 20 for feeding a liquid such as for example hot water under pressure to a water injector 14 which is releasable mounted (screwed) to the bell member 9.

Note that the thread 19 is just an example for connection means, be it releasable or permanent connection means.

The other components of the beverage production device, such as e.g. the mechanism for displacing the bell member and eventually also the capsule holder are known from the prior art in the field of capsule-based espresso machines.

The water injector comprises a perforation element (blade, pin, etc.) 24 designed to produce an opening in the top wall 17 of the capsule 1 when the capsule holder 13 and the bell member 9 are moved close together e.g. by a manually operated or an automatic mechanism. A channel (not shown in the drawings) traverses the perforation element 14 such that water can be fed to the interior of the capsule 1 once the perforation element 14 protrudes into the interior of the capsule 1.

The capsule 1 comprises said top wall 17, a sidewall 7 and a flange-like rim 6 with a clamping portion 29, wherein the foil member 5 is sealed to said flange-like rim 6 to close-off hermetically the cup-like base body 4 of the capsule 1. Again, other designs for the capsule are possible as long as the capsule can be sealed and contain the mentioned ingredients.

According to the present invention the outer surface of the capsule 1 presents a dedicated sealing member 8. The sealing member 8 can be resilient due to the material used and/or due to the geometrical shape of the sealing member 8.

Further on, the sealing member 8 can be integral to the capsule 1 or a separate piece. In the latter case the sealing member can be mounted releasably to the base body 4 or fixed thereto e.g. by welding or by means of an adhesive.

In case the sealing member 8 is a separate piece attached to the capsule 1, it can be mounted to the capsule as one integral piece. Alternatively it can be applied in fluid or viscous form and then can harden (e.g. polymerize) once applied onto the outer surface of the capsule, which is the case e.g. when applying silicone.

If a resilient material is used for the sealing member 8, preferably rubber-elastic materials are used. The term "rubber-elastic" means any suitable material having rubber elasticity including but not limited to elastomers, silicones, plastics, latex, balata or others.

Particularly suitable materials for the seal member 8 are: EPDM (Ethylene Propylene Diene Monomer), NBR (Acrylic Nitrile Rubber), TPE (thermoplastic elastomer) or silicone rubber. These materials have particular good flex, compressive properties and can resist high temperatures without cracking.

In case the material of the sealing member is the same as the one used for the capsule (e.g. a metal such as aluminum or plastics), preferably the resilient nature of the sealing member is procured by the geometrical shape of the sealing member.

In the embodiment according to FIG. 2 the sealing member 8 is resiliently deflectable due to the lip-shaped form. It prolongs the clamping portion 29 of the flange-like rim but it is not supposed to be clamped so as to be able to deflect freely under pressure. It is made from the same material as the capsule, preferably plastics. It can be an integral piece of the base body 4 of the capsule 1.

The clamping portion 29 of the flange-like rim is configured to form an annular surface that is clamped at least partially by the matching surfaces of the beverage production device. As a result, the sealing member 8 is released from the forces or stresses that can apply as a result of the tearing of the foil member 5 onto the relief elements 12.

The flexible free lip 8 extends from the outer edge of the flange-like rim 6 and is inclined outwards. In the shown embodiment the flexible lip is the edge of the side walls of the base body of the capsule, which edge is bent by an angle A (relative to the flat clamping portion of the flange-like rim or sealing plane P) of more than about 90 degrees, preferably comprised between 95 and 175 degrees.

Note that such deflectable sealing member 8 can be placed at any position onto the capsule 1 as long as the position is adapted for an exterior sealing engagement of the sealing member 8 and the enclosing member 9 between the water injector 14 and the perforations in the foil member 5. The sealing member 8 can also be provided on the region of the top wall 17 of the capsule 1 surrounding the water injector 14 when the water injector 14 is in a position protruding into the interior of the capsule 1. The sealing member 8 can also be arranged to cover different portions (bottom, side wall, flange-like rim) of the capsule.

Figure 3:
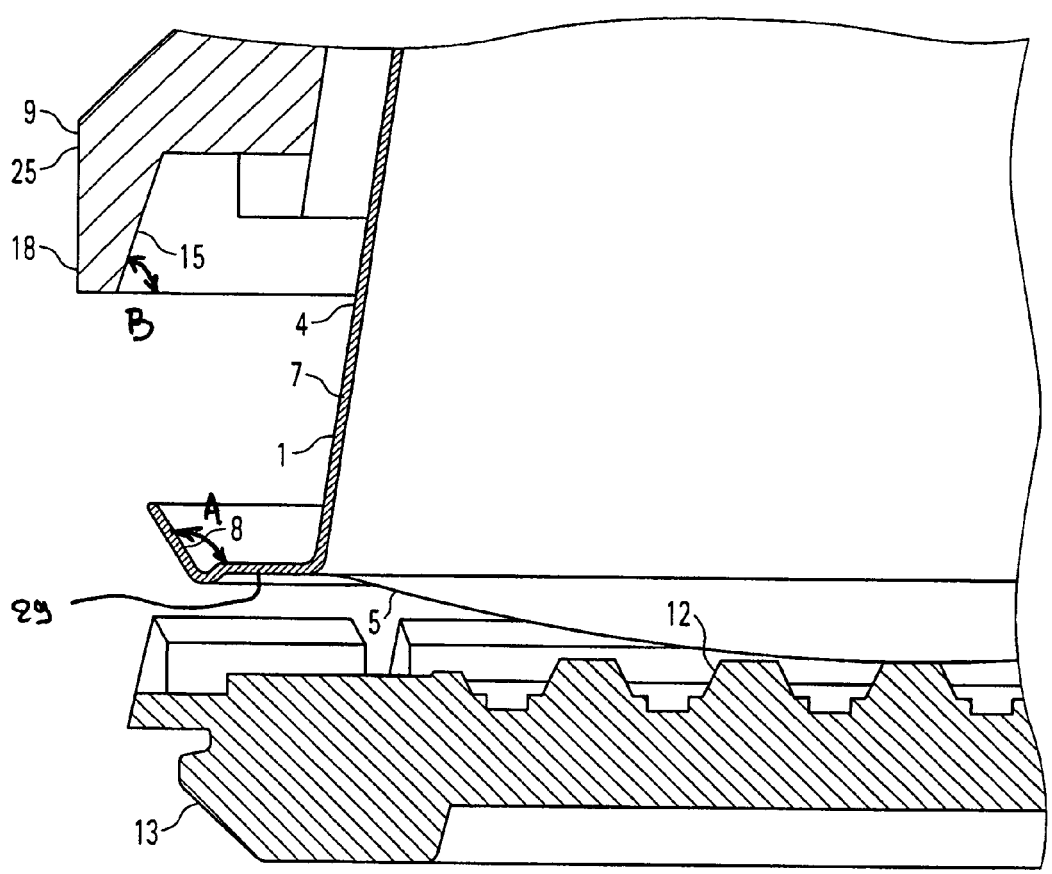
FIG. 3 shows an enlarged in view of FIG. 2.

As can be seen in detail in FIG. 3, the bell member 9 according to this embodiment does not comprise any dedicated resilient sealing member. However, the bell member optionally can also comprise a resilient sealing member.

An inclined sealing surface 15 of the bell member 9 is designed to cooperate with the resiliently deflectable sealing member 8 of the capsule 1. The sealing surface 15 is inclined toward the free flexible lip constituting the sealing member. In particular, the sealing surface 15 forms preferably an angle B relative to the sealing or closure plane P, when measured in the inward direction of the capsule, of 90 degrees or less. Preferably, the angle B is of from 85 to 50 degrees.

Depending on the form and material of the sealing member 8 of the capsule 1, the cooperating surface of the bell member 9 can have any shape, position and orientation which are adapted for a sealing engagement with the sealing member 8 of the capsule 1.

Figure 4:
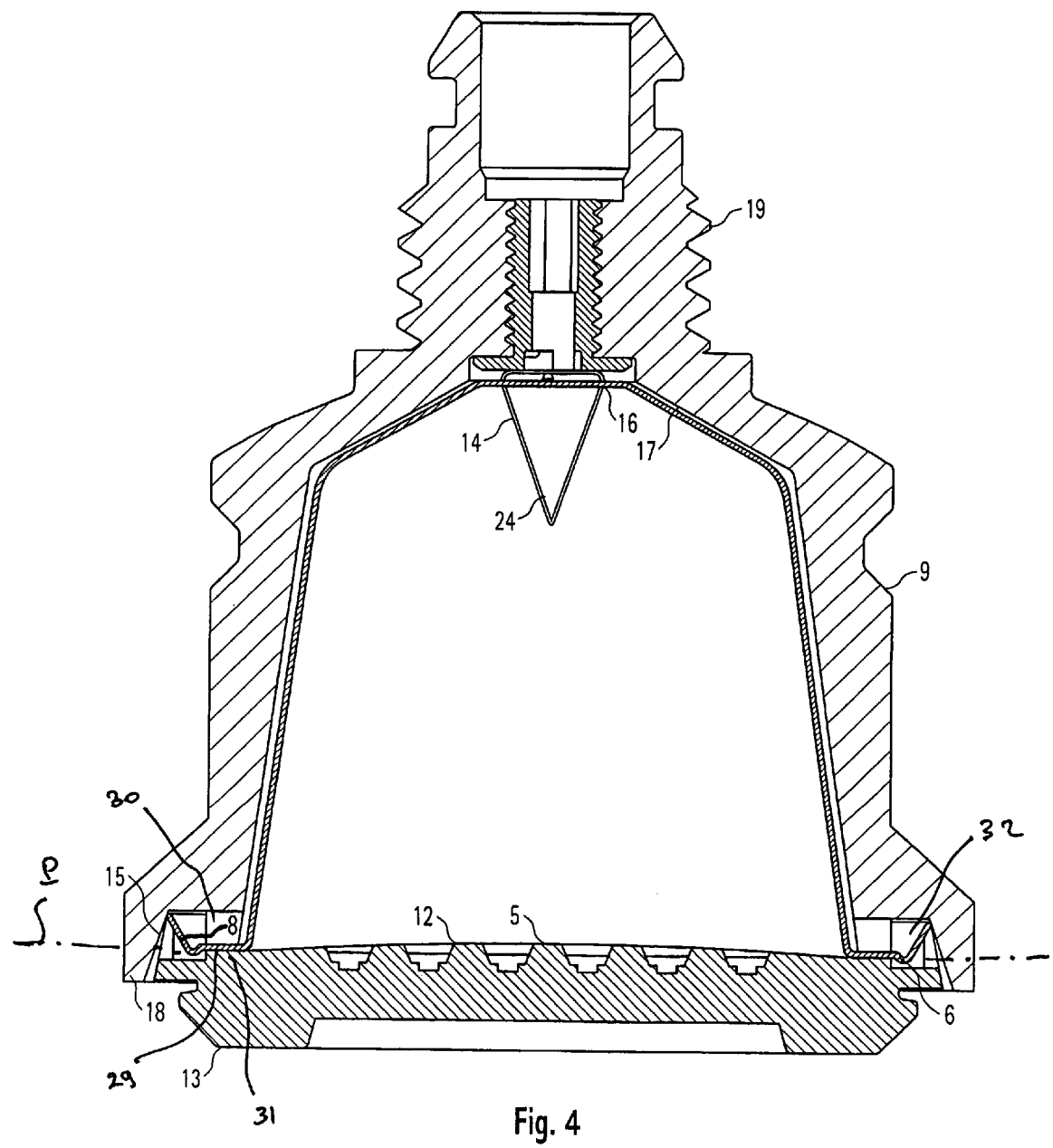
FIG. 4 shows the first embodiment in a state, in which a capsule has reached its closing position between a bell member and the capsule holder.

Upon closing of the device about the capsule, as shown in FIG. 4, the bell member 9 and capsule holder 13 clamp together the capsule along the clamping portion 29 of the flange-like rim. For this the bell member 9 can include one or more annular raising portions that firmly pinch or clamp the clamping portion 29 of the capsule onto a receiving portion surface 31 of the capsule holder. The clamping portion can further form an indent that is complementary an indentation of the surface 31. Therefore, an annular chamber 32 is formed as resulting from the assembly in closure of the bell member 9 and capsule holder 13 that encloses the sealing member 8. As a result the capsule is firmly held in place and tensile forces are released at the free lip that can deflect freely in the chamber toward the inclined surface 15 whereby a perfect watertight sealing can be obtained.

FIG. 4 shows the state in which the bell member 9 and the capsule holder 13 are brought in closing pressure engagement and due to the water entering the interior of the capsule and building up a pressure there the pyramidal relief members 12 of the capsule holder 13 have already produced openings in the foil member 5 of the capsule 1. Upon insertion of the capsule the blade element 24 of the water injector 14 creates a perforation 16 in the top wall 17 of the capsule 1. When a sufficient pressure of fluid has been built inside the capsule, the beverage produced from the ingredients contained in the capsule can be drained in small interstices between the relief members 12 and the surrounding foil member 5.

In the state shown in FIG. 4 the resiliently deflectable sealing member 8 of the capsule 1, i.e. the flexible lip, is biased against the corresponding inclined sealing surface 15 of the enclosing member 9. The annular support skirt 18 now covers the end of the flange-like rim 6 of the capsule 1 while the clamping portion 29 is clamped between surfaces 30, 31 of the device to ensure that the sealing member 8 and the capsule as such remain in position when the sealing surface 15 of the bell member exerts a certain pressure force of the sealing member 8.

Actually, the lip-shaped sealing member 8 represents an example of a construction for providing a self-reinforcing sealing engagement. Water coming from the water injector will be pressurized within the interstice between the exterior of the capsule and the enclosing member and will eventually arrive at the lip-shaped sealing member. The lip-shaped sealing member will block the water flow as it is biased against the sealing surface of the annular member. This blocking effect will lead to the pressure raising at the upstream-side of the sealing member which in turn will lead to the sealing member being pressed even stronger against the sealing surface and thus to a sealing engagement which is the stronger the higher the pressure at the sealing engagement.

Figure 5:
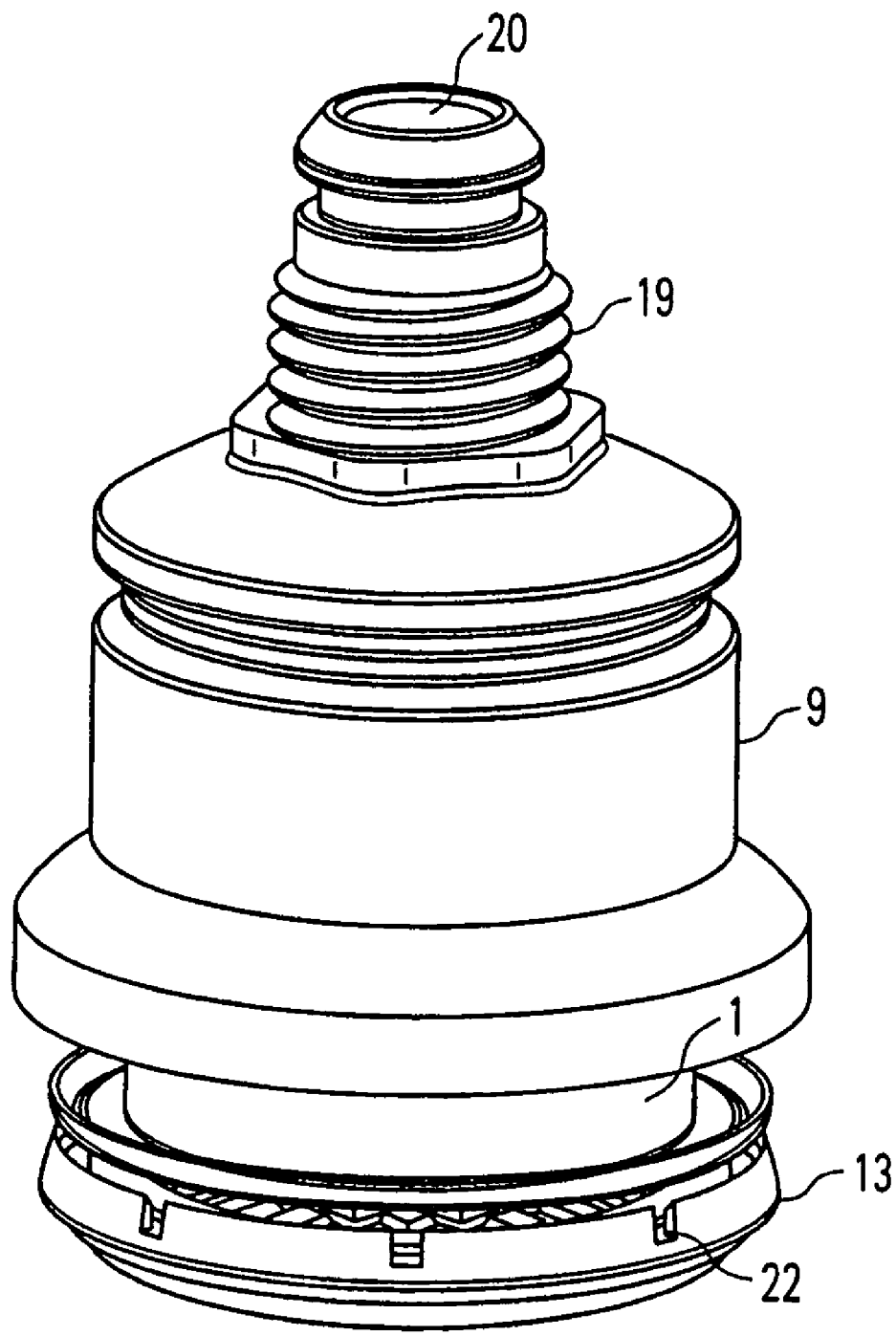
FIG. 5 shows a perspective view of a capsule holder, a bell member and a capsule according to the first embodiment in a position in which the capsule has not yet reached its closing position.

In the embodiment of FIG. 5 grooves 22 are provided in the circumference of capsule holder 13, which grooves 22 act to evacuate water which could settle or accumulate on the upper surface of the capsule holder 13 or dripping out of the capsule before the capsule has been removed.

Figure 6:
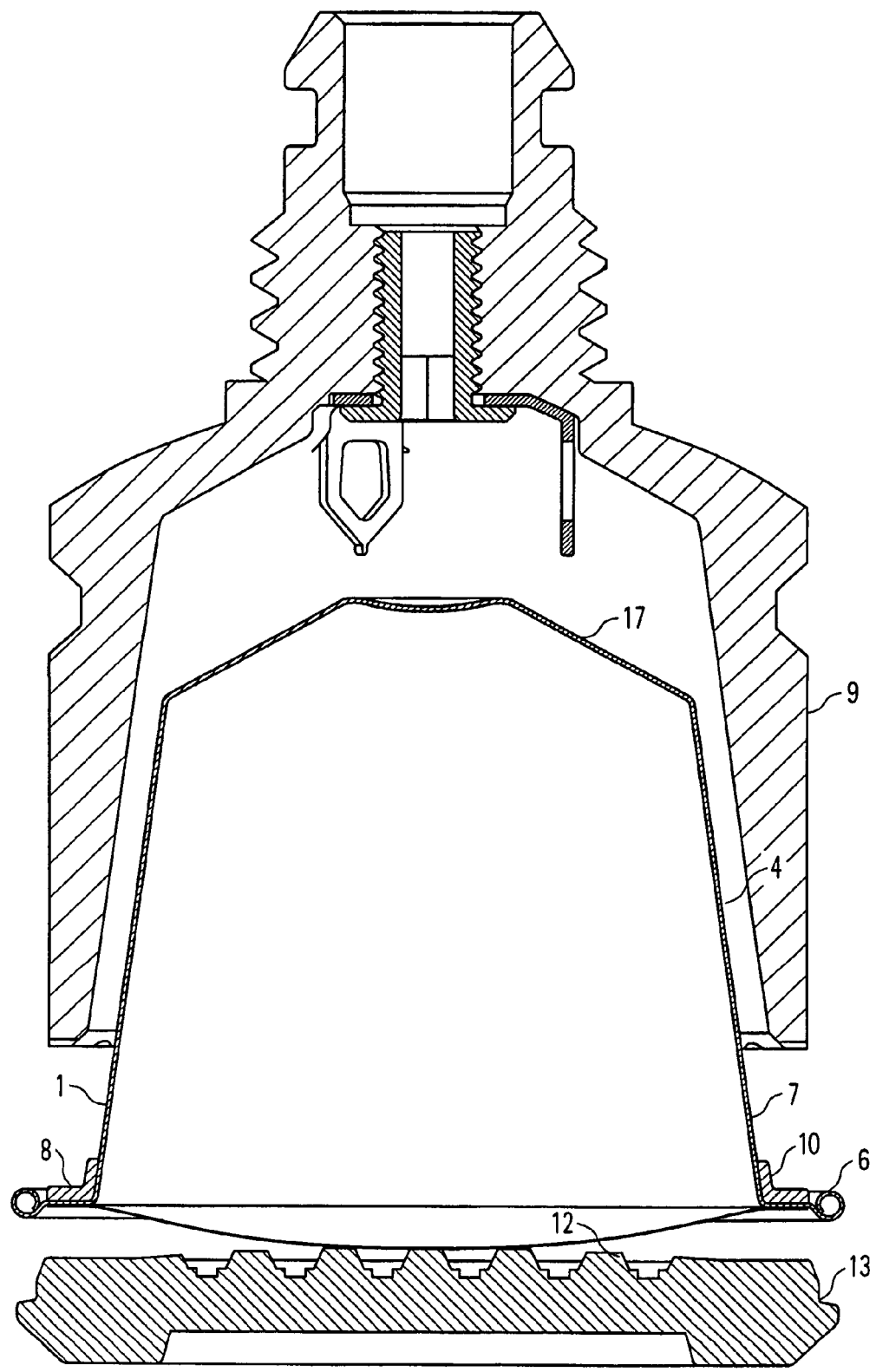
FIG. 6 shows a second embodiment of the present invention.
Figure 7:
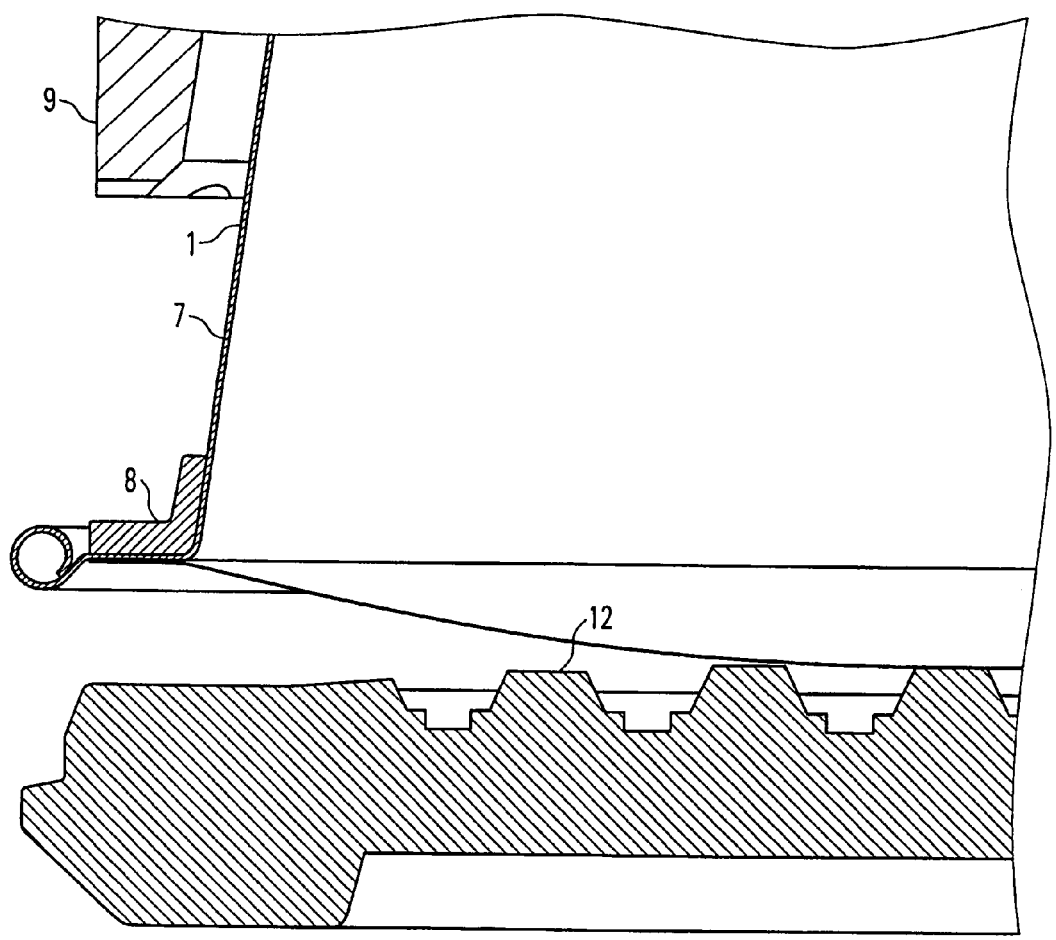
FIG. 7 is an enlarged view of a detail of FIG. 6.

FIG. 6 shows an embodiment essentially corresponding to a variant of the first embodiment of FIG. 2. The sealing member 8 according to this embodiment is compressible. It covers both a portion of the side wall 7 and the area between the outer end of the flange-like rim 6 of the capsule 1 and said side wall 7. (The sealing member can also cover only a portion of the side wall 7 of the base body 4 of the capsule 1.) The sealing member 8 according to this embodiment has a non-symmetrical, i.e. L-shaped cross-section. The sealing member can be made of a material that is more resilient than the material of the base body. In particular, the sealing member can have a hardness that is lower than the hardness of the material of the base body 4 of the capsule.

The sealing member is preferably a rubber-like material. Particularly suitable materials are: EPDM (Ethylene Propylene Diene Monomer), NBR (Acrylic Nitrile Rubber), TPE (thermoplastic elastomer) or silicone rubber. These materials have particular good flex, compressive properties and can resist high temperatures without cracking.

Alternatively, the sealing member 8 can have other shapes such as e.g. a film applied to the capsule, an O-ring, etc.

Figure 8:
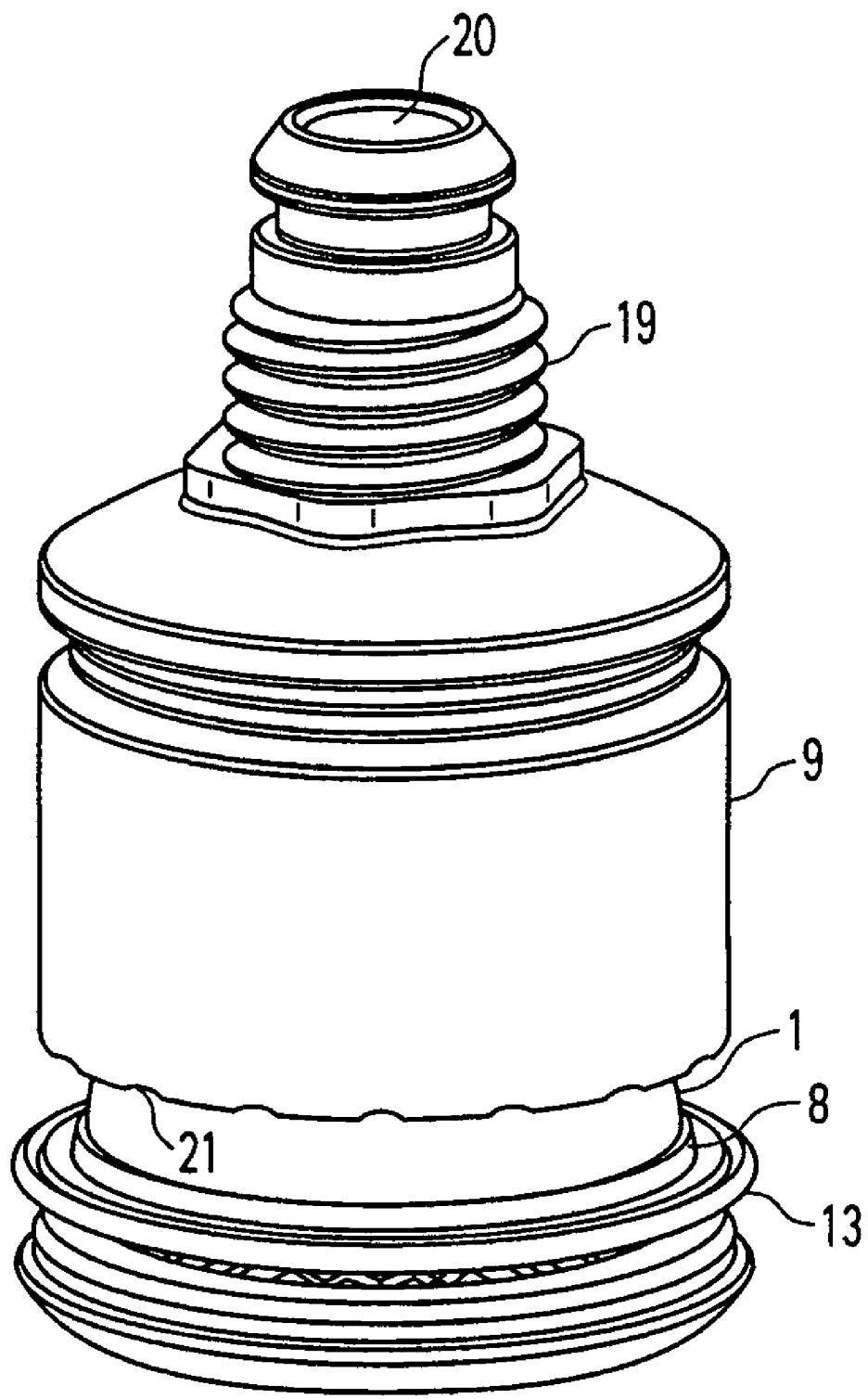
FIG. 8 is a perspective view of the second embodiment.

When the capsule 1 is in a position as shown in FIG. 4 and then, after having finished the beverage production process, the holder 13 is opened, there is a risk that the capsule 1, instead of falling down, remains sucked into the bell member 9 due a "vacuum effect". As shown in FIG. 8 the invention proposes to provide for a mechanism which-assures that the type sealing engagement between the capsule 1 and the bell member 9 is only present as long as the bell member 9 is engaged against the capsule holder 13, but automatically released such that air can get into the space between the top wall 17 and the side walls 7 of the capsule 1 and the inner wall of the bell member 9, respectively.

As can be seen from FIG. 8, especially in case the sealing member 8 covers a portion of the side walls 7 of the capsule 1, the annular front surface of the bell member 9 can be provided with grooves 21 which, act as air inlet passage for feeding air. The grooves allow the intake of air once the biasing force between the bell member 9 and the capsule holder 13 is released. Air is thus flowing into this space and it will be easier for the user to take out the capsule 1. Eventually, the capsule 1 will even automatically fall down from the bell element 9.

Figure 9:
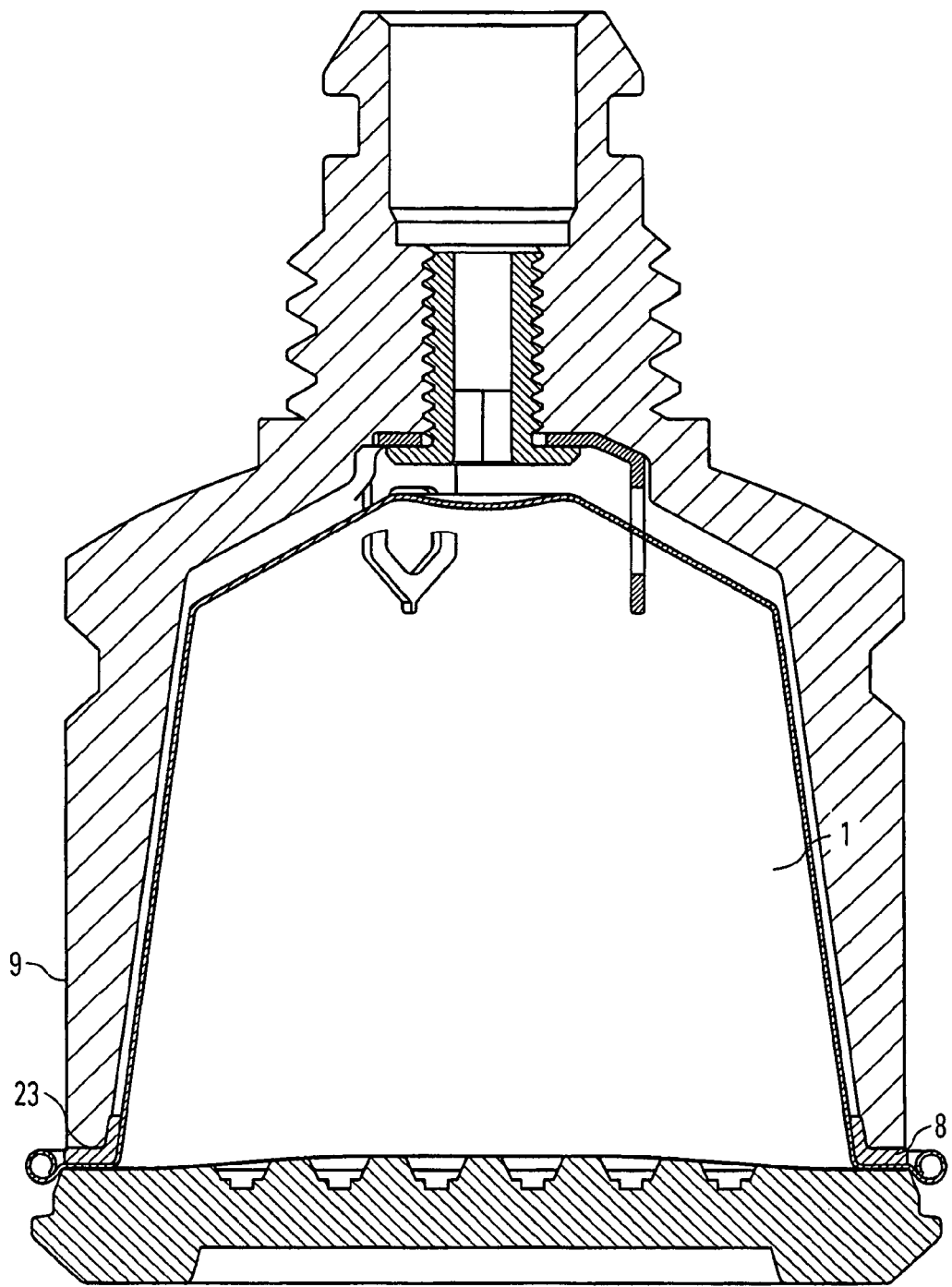
FIG. 9 shows the second embodiment in a state in which the capsule has reached its closing position.

FIG. 9 shows the state of the second embodiment in which the front surface 23 of the bell member 9 is in sealing engagement with the sealing member 8 of the capsule 1.

Figure 10:
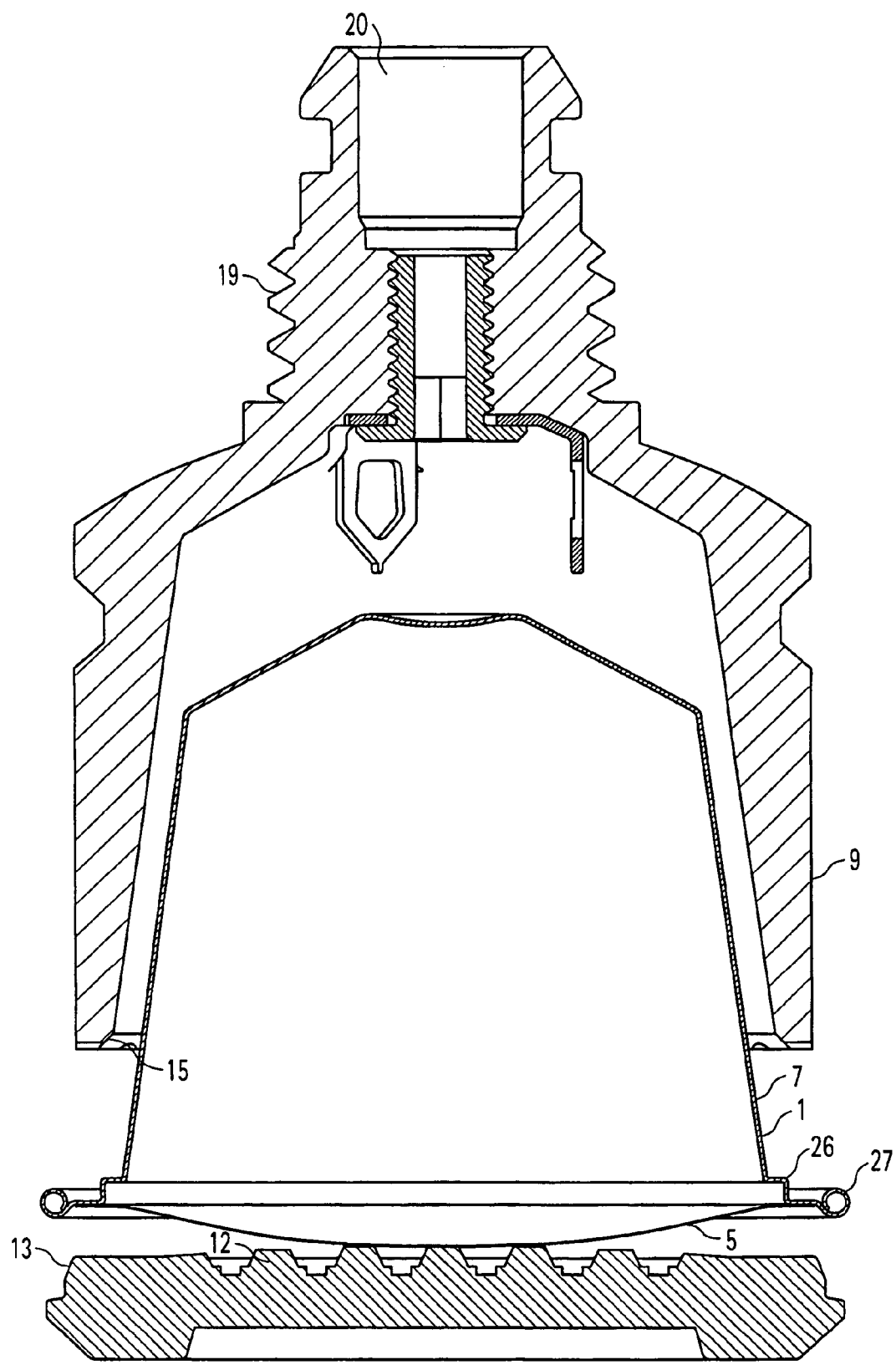
FIG. 10 shows a third embodiment in which the sealing member of the capsule is part of the side wall of the capsule.
Figure 11:
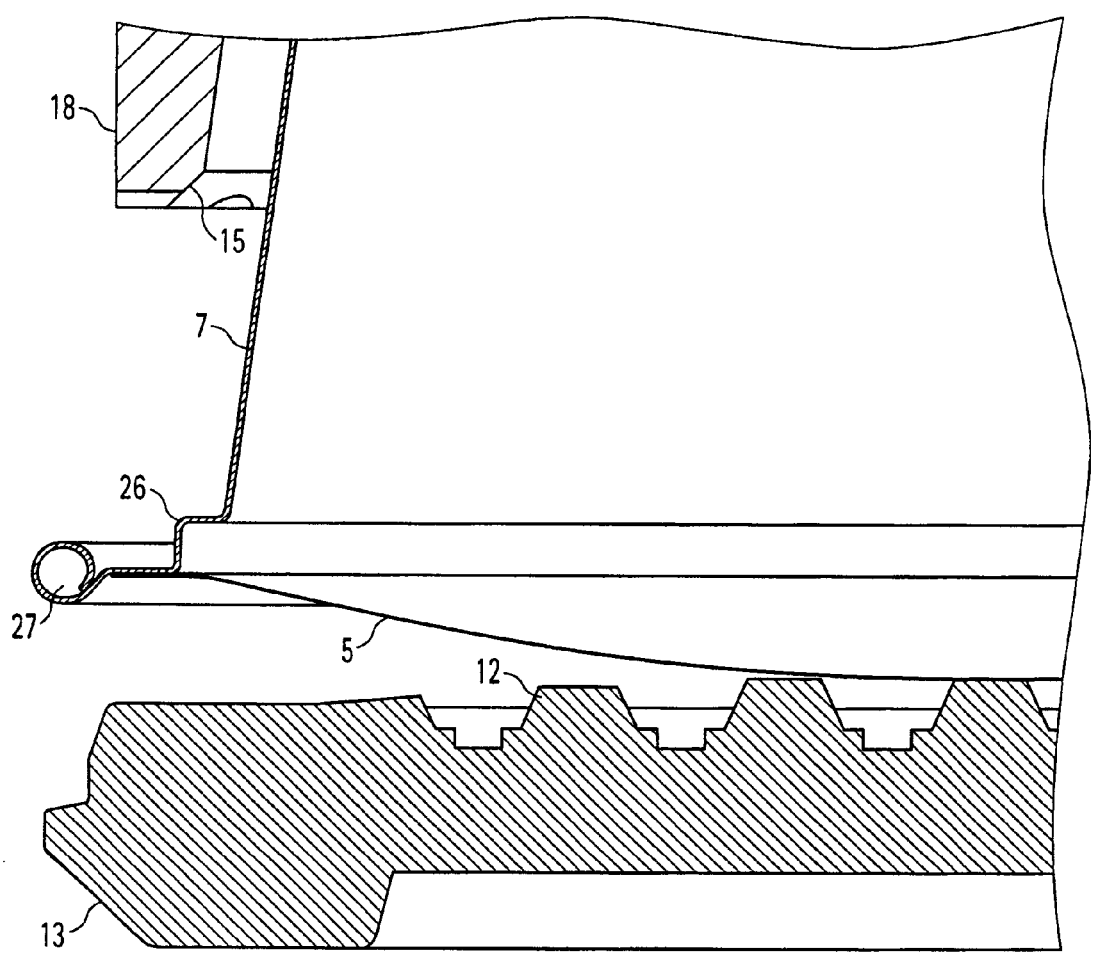
FIG. 11 is a detailed view of FIG. 10.
Figure 12:
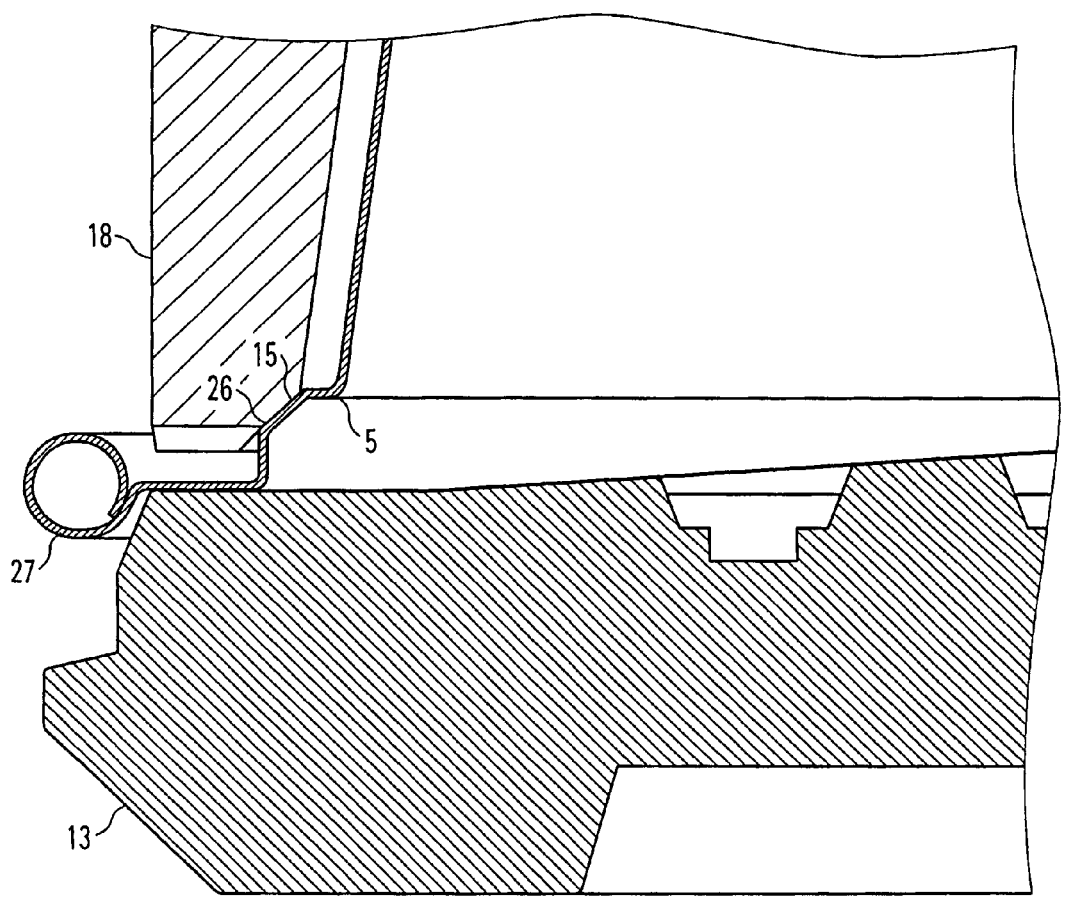
FIG. 12 shows the sealing engagement according to the third embodiment.

FIGS. 10 to 12 show a third embodiment of the present invention in which the resilient nature of the sealing member is due to the geometrical hollow shape of the capsule itself. In the depicted embodiment the sealing member has the shape of a step 26, i.e. a sudden increase of the diameter of the side wall 7 of the capsule 1. Therefore, the sealing member forms a hollow deflectable and compressible structure sufficient to deforms under the closure forces applied by the bell-shaped member onto the capsule holder 13. Note that the geometrical form is not limited to the shown step and other forms are viable as long as they procure a resilient or at least deformable nature of the sealing member.

The step-like sealing member 26 according to this embodiment is only one example for a hollow sealing member (in contrast e.g. to the "filled" sealing member 8 according to the second embodiment, FIGS. 6 to 9). When the resiliency of the sealing member is procured by the geometrical hollow shape, usually a deflection of the sealing member occurs (here: inwards and downwards deformation of the step). On the other hand, when the resilient nature is due to the material used and a "filled" sealing member is used, usually a compression and/or displacement of the material occurs. Preferably, the material for the capsule will be chosen amongst polymeric materials having deflectable and resilient properties.

The sealing surface 15 according to this embodiment is inclined. Thus the sealing pressure has a first component being directed radially inside and another component being directed axially (downwards in FIG. 12).

As can be seen especially from FIG. 12, the foil member 5 can be wrapped (see reference 27) over the rim of the capsule.

Figure 13:
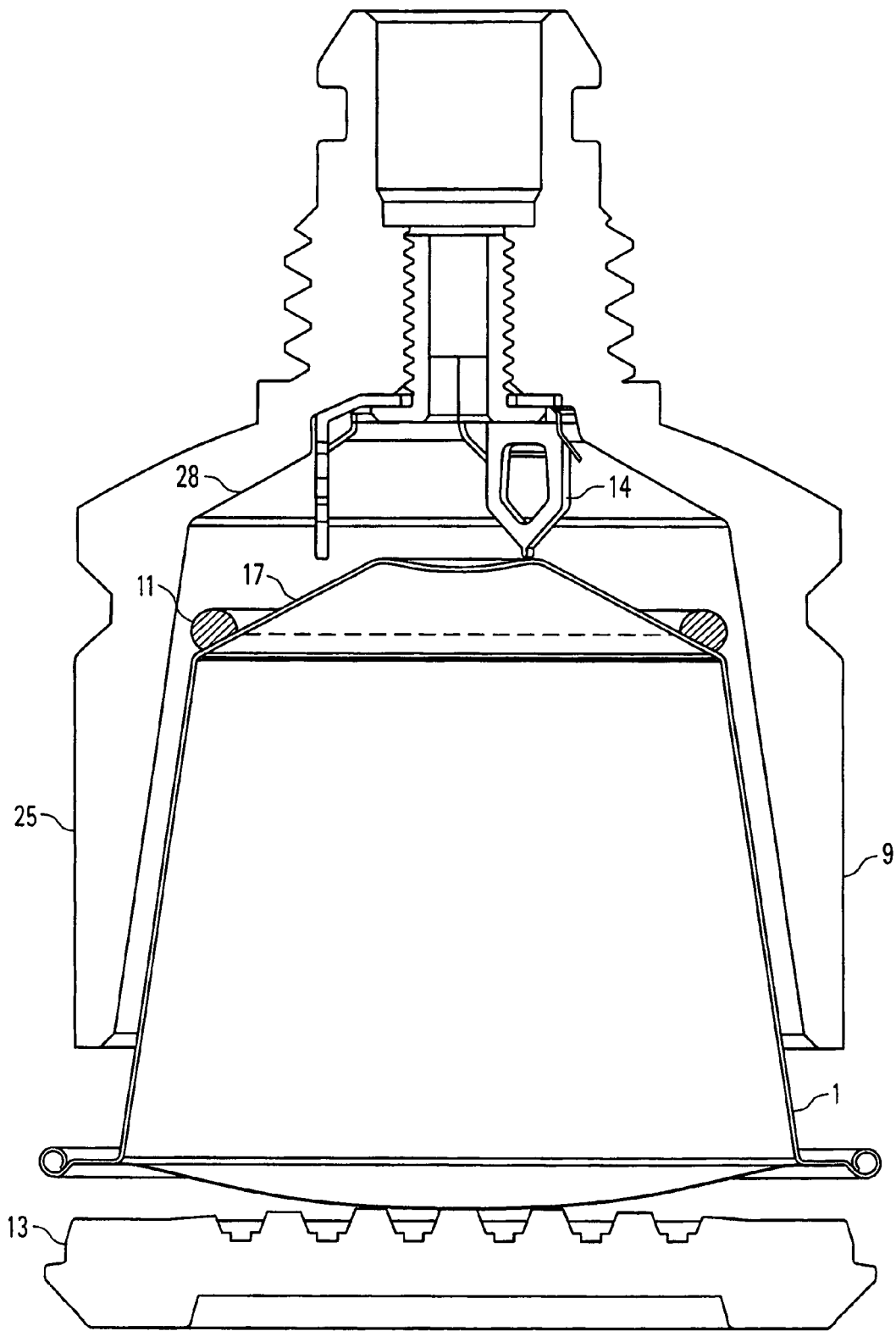
FIG. 13 shows a fourth embodiment in which the sealing member is part of the top wall member of the capsule.
Figure 14:
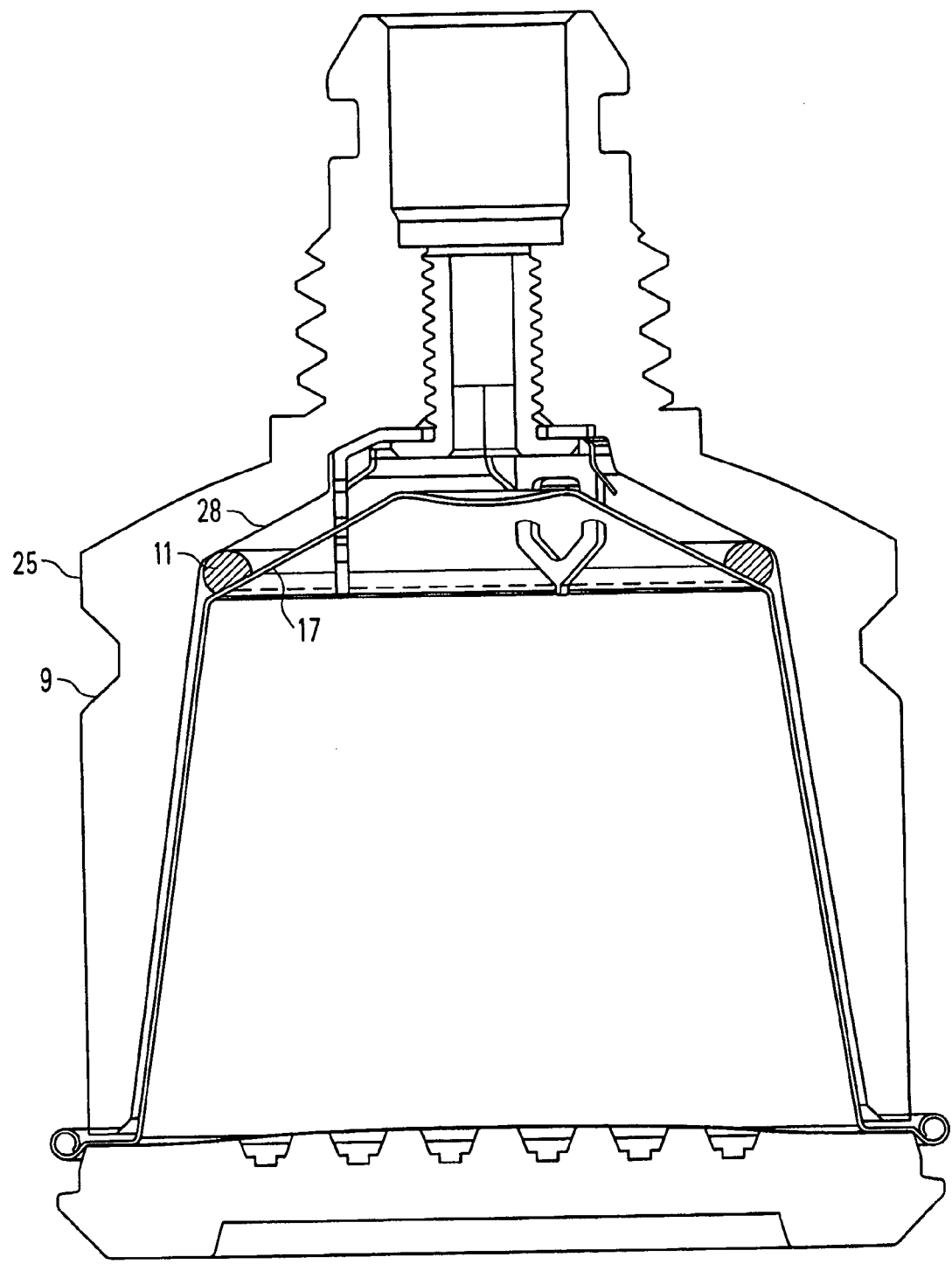
FIG. 14 shows the fourth embodiment in the final state.

FIG. 13 and FIG. 14 show a fourth embodiment in which the sealing member is an O-ring 11. The O-ring is geometrically arranged and, preferably fixed, on the top wall 17 of the capsule 1. This is just an example of providing a sealing member at the exterior of the capsule 1 at the side which faces the water injector and which will be perforated in order to create the water inlets to the capsule 1.

The O-ring 11 is positioned to peripherally surround the area in which the water injector 14 perforates the top wall 17 of the capsule 1. The sealing member 11 is thus compressed by the bottom 28 of the enclosing member 9 and (see FIG. 14) secured in place by the upper end of the circumferential side wall 25 of the enclosing member 9.

Note that the bottom 28 can be substantially flat or inclined to ensure a sufficiently water-tight interface with the sealing member 11 when the capsule is fully engaged in the enclosing member 9 at closing of the device.

As an alternative to the O-ring 11, also a deflectable lip-like sealing member (e.g. comparable to the lip 8 according to the first embodiment, see FIG. 2) can be placed protruding from the top wall 17 of the capsule 1, i.e. the wall facing the water injector 14.

In any case, the bottom 28 will exert an axial compression force on the sealing member 11.

In case e.g. an O-ring is placed on the side wall 7 of the capsule 1, the radial component of the compression force will prevail.

In an alternative, the foil member 5 could be replaced by a wall that can be pierced against at least one relief element before water is injected in the capsule, for instance, as resulting of the closure of the machine about the capsule.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A capsule for containing beverage ingredients, the capsule being designed for insertion in a beverage production device in which a liquid under pressure enters the capsule in order to interact with the ingredients in the capsule and to produce a beverage from the capsule, wherein the capsule comprises a cup-like body comprising a top wall, a flange-like rim, a sidewall extending between the top wall and the rim, and a transition area connecting the sidewall and flange-like rim, with the flange-like rim comprising a transverse extension that includes a portion for being pressed on each side between matching surfaces of the beverage production device, and a sealing member provided on the transverse extension portion of the flange-like rim and extending over the transition area and to the sidewall, the sealing member being configured to be compressible in sealing engagement with at least a matching pressing surface of the beverage production device and the sealing member being resilient.

2. The capsule according to claim 1, wherein the sealing member is resilient due to its shape.

3. The capsule according to claim 1, wherein the sealing member is arranged to exert a biasing force against the matching pressing surface of the beverage production device.

4. The capsule according to claim 1, wherein the sealing member is compressible and resilient due to the constituent material.

5. The capsule according to claim 1, wherein the sealing member has a hollow deflectable structure.

6. The capsule according to claim 4, wherein the sealing member is designed to compress from a first uncompressed thickness to a second compressed thickness.

7. The capsule according to claim 1, wherein the sealing member is made of a material other than the material of the rest of the capsule.

8. The capsule according to claim 7, wherein the sealing member is made of a material having a lower hardness than the material of the rest of the capsule.

9. The capsule according to claim 6, wherein the sealing member is made of a rubber-elastic material.

10. The capsule according to claim 9, wherein the rest of the capsule is made of non-rubber elastic material and/or metal such as aluminum.

11. The capsule according to claim 1, wherein the sealing member is made from at least one of the constituent material(s) of the rest of the capsule.

12. The capsule according to claim 1, wherein the capsule is comprised of a first and a second wall element being connected with each other in an gas-tight fashion in a flange-like rim area in order to create a sealed interior for the ingredients.

13. The capsule according to claim 1, wherein the capsule comprises a cup-like base body and a closure member.

14. The capsule according to claim 11, wherein the sealing member is an integral part of one of the wall elements.

15. The capsule according to claim 6, wherein the sealing member is a piece different from the wall elements of the capsule.

16. The capsule according to claim 15, wherein the sealing member has the shape of an O-ring.

17. The capsule according to claim 16, wherein the sealing member has a L-shaped cross-section.

18. The capsule according to claim 15, wherein the sealing member is attached to one of the wall elements using an adhesive or by welding or by pinching or crimping or a combination thereof.

19. A beverage producing system, comprising a capsule for containing beverage ingredients, the capsule being designed for insertion in a beverage production device in which a liquid under pressure enters the capsule in order to interact with the ingredients in the capsule and to produce a beverage from the capsule, wherein the capsule comprises a cup-like body comprising a top wall, a flange-like rim, a sidewall extending between the top wall and the rim, and a transition area connecting the sidewall and flange-like rim, with the flange-like rim comprising a transverse extension that a portion for being pressed on each side between by matching surfaces of the beverage production device, and a sealing member provided on the transverse extension portion of the flange-like rim and extending over the transition area and to the sidewall, the sealing member being configured to be compressible in sealing engagement with at least a matching pressing surface of the beverage production device and the sealing member being resilient; and a beverage production device having an enclosing member adapted to be selectively in sealing engagement with the sealing member of the capsule.

20. The system according to claim 19, wherein the sealing engagement is only effective as long as the enclosing member exerts a minimum pressure on the capsule, but is automatically released as soon as the pressure falls below said minimum pressure.

21. The system according to claim 20, wherein grooves are provided in the circumference of the enclosing member, which grooves act as air inlet passages for feeding air through these grooves and through the released sealing engagement between the capsule and the enclosing member.

22. The system according to claim 19, wherein the enclosing member comprises additional sealing means adapted to assist to the sealing engagement between the enclosing member and the capsule.

23. The system according to claim 19, wherein the sealing pressure acting at the sealing engagement has a radial an/or axial component relative to the center axis of the capsule.

24. A method for producing a beverage, which comprises:
   inserting a capsule according to claim 1 into a beverage production device configured to receive the capsule and having at least a matching pressing surface for engaging the sealing member of the capsule for compression thereof;
   introducing water into the capsule for combining with the beverage ingredients to form the beverage; and
   dispensing the beverage from the capsule and device;
   wherein the water can only flow through the capsule due to the sealing engagement of the sealing member and matching pressing surface of the device.

25. The method of claim 24, wherein the capsule comprises a cup-like base body and a bottom closure member, and which further comprises introducing the water through the top wall of the capsule and dispensing the beverage through the bottom closure member.

26. A method for producing a beverage using the beverage producing system of claim 19, which comprises:
   inserting the capsule into the beverage production device with the matching pressing surface engaging the sealing member of the capsule for compression thereof;
   introducing water into the of the capsule for combining with the beverage ingredients to form the beverage; and
   dispensing the beverage from the capsule and device;
   wherein the water can only flow through the capsule due to the sealing engagement of the sealing member and matching pressing surface of the beverage production device.

27. The capsule according to claim 1, wherein the sealing member is a rubber-like material selected from the group consisting of EPDM, NBR, TPE or silicone rubber.

28. The system according to claim 19, wherein the sealing member is a rubber-like material selected from the group consisting of EPDM, NBR, TPE or silicone rubber.

* * * * *

UNITED STATES PATENT AND TRADEMARK OFFICE
CERTIFICATE OF CORRECTION

PATENT NO. : 7,993,691 B2  
APPLICATION NO. : 11/258433  
DATED : August 9, 2011  
INVENTOR(S) : Yoakim et al.

Page 1 of 1

It is certified that error appears in the above-identified patent and that said Letters Patent is hereby corrected as shown below:

Column 11:
Line 18 (claim 19, line 11), after "between" delete "by".

Signed and Sealed this

Thirteenth Day of September, 2011

David J. Kappos
*Director of the United States Patent and Trademark Office*